LOGIC CIRCUITRY ADAPTED TO CONTROL THE TRANSFER
OF INFORMATION TO A STORAGE ELEMENT
Original Filed Oct. 14, 1960
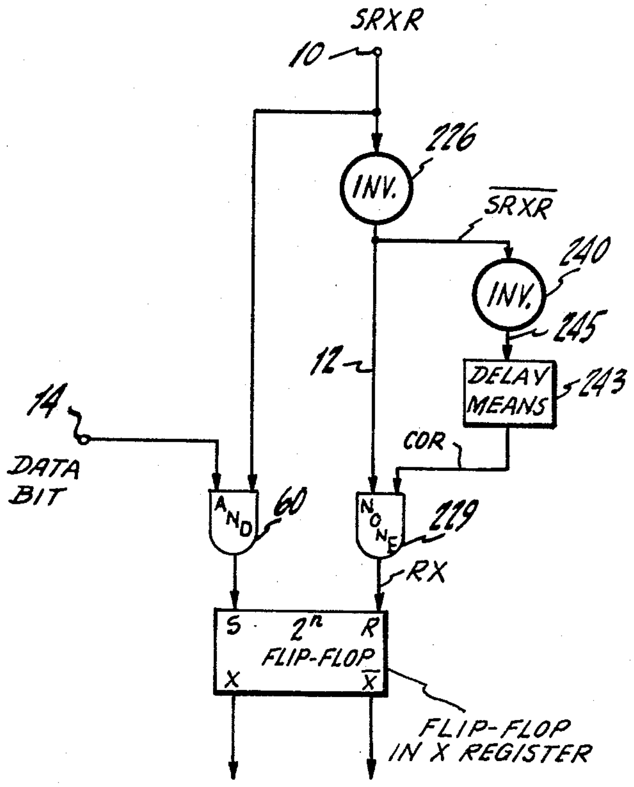
INVENTORS:-
ELI GLOATES AND
LASZLO L. RAKOCZI
BY Samuel Colman
ATTORNEY

United States Patent Office 3,325,790

Patented June 13, 1967

3,325,790

LOGIC CIRCUITRY ADAPTED TO CONTROL THE TRANSFER OF INFORMATION TO A STORAGE ELEMENT

Eli Gloates, Haddonfield, N.J., and Laszlo L. Rakoczi, Phoenix, Ariz., assignors to Radio Corporation of America, a corporation of Delaware Original application Oct. 14, 1960, Ser. No. 62,644, now Patent No. 3,234,518, dated Feb. 8, 1966. Divided and this application July 15, 1964, Ser. No. 382,911

7 Claims. (Cl. 340—173)

This application is a division of application Ser. No. 62,644, filed Oct. 14, 1960, titled, Data Processing System, and issued as Patent No. 3,234,518 on Feb. 8, 1966.

The object of this invention is to provide an improved system for transferring binary information through an input gate to a storage device.

The storage device of the present circuit may be a flip-flop having a set input terminal and a reset input terminal. The circuit includes two logic gates, the first for information flow and connected at its output to the set terminal, and the second for resetting the flip-flop and connected at its output to the reset terminal. The data transfer command input terminal is connected to one input of the first gate and is connected through separate paths, one including a delay means, to both inputs of the second gate. In response to the absence of the read-in command, the first logic gate is maintained disabled through its connection to the read-in command terminal and the second logic gate is maintained primed through the path which includes the delay means. In response to the data transfer command, the first gate becomes primed, and the other path to the second gate applies an enabling signal to the second gate, causing the second gate to apply a reset signal to the flip-flop. After the delay inserted by the delay means, the priming input applied to the second gate by the path including the delay means changes to a disabling input, thereby removing the reset signal from the flip-flop. The delay interval, however, is of shorter duration than the read-in command so that the first input gate continues to remain primed after the second gate is disabled. Accordingly, after the automatic reset of the flip-flop, information may flow through the first gate to the flip-flop.

The invention is discussed in greater detail below and is illustrated in the drawing, the single figure of which is a block circuit diagram of the invention.

In the circuit of the present invention, electrical signals manifest binary digits (bits). A signal at one level represents the bit 1, and a signal at another level represents the bit 0. To simplify the following discussion, the bit itself rather than the signal manifesting that bit is referred to.

The logical elements shown in the figure are in themselves known. The AND gate produces a 1 output in response to two 1 inputs and a 0 output in response to all other input conditions. The NONE gate, sometimes also known as a NOR gate, produces a 1 output in response to two 0 inputs and a 0 output in response to all other input conditions. An inverter produces the complement of the input bit applied thereto. The delay means 243 introduces a relatively short delay, shorter than the duration of the input command $SRXR=1$.

The circuit shown includes a flip-flop having set (S) and reset (R) input terminals. A 1 applied to the set terminal causes the flip-flop to assume one state and a 1 applied to the reset terminal causes the flip-flop to assume its other state. AND gate 60 is connected to the set terminal and NONE gate 229 is connected to the reset terminal. The data transfer command signal SRXR is applied to the common input terminal 10. Inverter 226 is connected to input terminal 10 and applies its output both to NONE gate 229 and to inverter 240. The inverter 240 is connected through lead 245 and delay means 243 to the second input to NONE gate 229.

In the operation of the circuit above, SRXR is initially equal to 0. Thus, AND gate 60 is disabled. The inverter 226 produces an output $\overline{SRXR}=1$. This 1, appearing on the input lead 12, disables NONE gate 229. However, the inverter 240 and delay means 243 derive from $\overline{SRXR}=1$ an output $COR=0$. $COR=0$ is a priming signal for NONE gate 229.

When it is desired to initiate the transfer of a data bit into the register, the transfer command SRXR is changed to 1. The 1 acts as a priming signal for AND gate 60. Inverter 226 produces an output $\overline{SRXR}=0$ on input lead 10 to NONE gate 229. The second input is $COR=0$ so that NONE gate 229 becomes enabled and produces a reset pulse $RX=1$, which is applied to the reset terminal of the flip-flop. However, after a short delay interval inserted by delay means 243, the bit on lead 245, which is equal to 1, appears as $COR=1$ on the second input lead to NONE gate 229. This signal disables the NONE gate, removing the reset signal from the flip-flop.

The duration of the signal $SRXR=1$ is greater than the delay inserted by the delay means 243. Accordingly, AND gate 60 remains primed after the NONE gate 229 has become disabled and after the reset signal $RX=1$ is removed from the flip-flop. Therefore, any data bit present at the data input terminal 14 passes through AND gate 60 to the flip-flop. If the data bit is a 1, the flip-flop becomes set, indicating storage of a 1; if the data bit is a 0, the flip-flop remains reset, indicating storage of a 0.

The circuit discussed above appears in the parent application in three different figures. The AND gate 60 and the flip-flop appear in FIGURE 2. Inverter 226 and NONE gate 229 appear in FIGURE 13. Inverter 240 and delay means 243 appear in FIGURE 14. To permit the reader more easily to see where in the system of the parent application the present circuits are found, the reference numerals and letters of the parent application are applied to the corresponding circuit elements and leads of the present figure. In addition, the numerals 10, 12 and 14 have been added to the present figure to help the reader follow the explanation.

What is claimed is:

1. In combination, a two-state circuit having a set input terminal and a reset input terminal;

two logic gates, the first connected at its output to the set terminal, and the second connected at its output to the reset terminal; and means responsive to a single selection signal for concurrently energizing the second gate causing it to apply a reset signal to the two-state circuit, and priming the first gate, and, after a predetermined interval, disabling the second gate.

2. In combination, a two-state circuit having a set input terminal and a reset input terminal;

two logic gates, the first connected at its output to the set terminal, and the second connected at its output to the reset terminal; and means for concurrently applying a reset signal to the two-state circuit and priming the first gate, said means including:

a common terminal;

means including delay means connected between said common terminal and the second gate for priming the second gate in response to the manifestation at said common terminal of a bit of one value and disabling the second gate in response to the manifestation of said common terminal of a bit of opposite value; and means responsive to a change at said common terminal from the manifestation of a bit of said one value to the manifestation of a bit of said opposite value for concurrently priming the first gate, and applying an enabling signal to the second gate causing the second gate to apply a reset signal to the two-state circuit, whereby, after the delay interval inserted by the delay means, the second gate becomes enabled.

3. In combination, a two-state circuit having a set input terminal and a reset input terminal;

two logic gates, the first connected at its output to the set terminal, and the second connected at its output to the reset terminal; and means for concurrently applying reset signal to the two-state circuit and priming the first gate, said means including:

a common terminal;

means including delay means connected between said common terminal and the second gate for priming the second gate in response to the presence of a signal representing the bit zero at said common terminal, and disabling the second gate in response to the presence of a signal representing the bit one at said common terminal; and means responsive to a change in the signal at said common terminal from one representing the bit zero to one representing the bit one for priming the first gate and applying an enabling signal to the second gate causing the second gate to apply a reset signal to the two-state circuit, whereby, after the delay interval inserted by the delay means, the second gate becomes disabled.

4. In combination, a flip-flop having set and reset input terminals;

a two-input first logic gate connected at its output terminal to said set terminal;

a two-input second logic gate connected at its output terminal to said reset terminal;

a priming signal input terminal connected to both gates which, when active, places each gate in condition to conduct;

means for inverting and delaying a signal coupled between said priming signal input terminal and the second input terminal to said second gate, said means serving to disable the second gate after the delay it inserts, in response to a priming signal; and a data signal input terminal connected to the second terminal of said first gate.

5. In combination, a flip-flop having set and reset input terminals;

a two-input AND gate connected at its output terminal to said set terminal;

a two-input NONE gate connected at its output terminal to said reset terminal;

a priming signal input terminal directly connected to the AND gate and connected through an inverter to the NONE gate;

means for inverting and delaying a signal coupled between the output of said inverter and the second input to said NONE gate; and a data signal input terminal connected to the second terminal of said AND gate.

6. In combination, a two-state circuit having a set input terminal and a reset input terminal;

two logic gates, the first connected at its output to the set terminal and the second connected at its output to the reset terminal;

read-in command input terminal means connected to both gates for applying a disabling signal to a first terminal of each gate and a priming signal to the second terminal of the second gate in the absence of a read-in command signal, and for applying a priming signal to said first terminal of each gate and a disabling signal to said second terminal of the second gate in response to the presence of a read-in command signal; and a delay means in the path between the selection input terminal and the second terminal of the second gate.

7. In the combination set forth in claim 6, said first gate being an AND gate and said second gate being a NONE gate.

No references cited.

BERNARD KONICK, *Primary Examiner.*

J. BREIMAYER, *Assistant Examiner.*